(12) United States Patent
Park et al.

(10) Patent No.: US 6,843,587 B2
(45) Date of Patent: Jan. 18, 2005

(54) SURFACE LIGHT SOURCE APPARATUS, AND METHOD AND APPARATUS FOR MANUFACTURING THE SAME

(75) Inventors: Deuk Il Park, Suwon (KR); Soon Cheon Cho, Bucheon (KR); Sang Mook Kim, Suwon (KR); Ok Bin Sur, Ohsan (KR); Choong Yop Rhew, Suwon (KR); Min Ho Kim, Suwon (KR); Chi Un Jo, Anyang (KR); Sung Su Zoo, Pyungtaek (KR)

(73) Assignee: LS Tech Co., Ltd., Hwasung (KR)

( * ) Notice: Subject to any disclaimer, the term of this patent is extended or adjusted under 35 U.S.C. 154(b) by 0 days.

(21) Appl. No.: 10/419,527

(22) Filed: Apr. 21, 2003

(65) Prior Publication Data

US 2003/0210539 A1 Nov. 13, 2003

(51) Int. Cl.[7] .................................................. F21V 5/00
(52) U.S. Cl. ........................ 362/331; 362/31; 362/561
(58) Field of Search ........................... 362/26, 31, 551, 362/561, 331, 332

(56) References Cited

U.S. PATENT DOCUMENTS

| 6,522,373 B1 | * | 2/2003 | Hira et al. | 349/65 |
| 6,530,671 B2 | * | 3/2003 | Taniguchi et al. | 362/31 |
| 6,717,635 B2 | * | 4/2004 | Taniguchi et al. | 349/65 |
| 6,729,736 B2 | * | 5/2004 | Umemoto | 362/31 |

FOREIGN PATENT DOCUMENTS

| KR | P 1994006336 | 3/1994 |
| KR | P 1996015029 | 5/1996 |
| KR | P 1996015030 | 5/1996 |
| KR | P 1996024562 | 7/1996 |
| KR | P 2000063748 | 11/2000 |

* cited by examiner

Primary Examiner—John Anthony Ward
(74) Attorney, Agent, or Firm—Volp and Koenig, P.C.

(57) ABSTRACT

An apparatus for manufacturing a surface light source apparatus in which a light guide pattern portion is formed on a light guide panel includes a pattern design system to which data about a pattern to be formed on the light guide pattern is input. A control system is connected to the pattern design system and transmits a position signal matching a coordinate value of each pattern to be formed on the light guide panel. A header moving portion mechanically moves vertically and horizontally according to the position signal received from the control system. A laser system outputs a laser beam according to a pulse signal synchronized with a movement of the header moving portion. A lens portion allows a laser beam output from the laser system to pass the header moving portion and to be focused on a scanning surface of the light guide panel. A warp prevention unit prevents the light guide panel from warping due to a local heating by the laser beam. An absorption and scattering prevention unit prevents smoke generated when the light guide pattern portion is formed on the light guide panel.

7 Claims, 12 Drawing Sheets

SURFACE LIGHT SOURCE APPARATUS, AND METHOD AND APPARATUS FOR MANUFACTURING THE SAME

BACKGROUND OF THE INVENTION

This application claims the priorities of Korean Patent Application No. 2002-26023, Korean Patent Application No. 2002-28919, and Korean Patent Application No. 2003-3466, respectively filed on May 11, 2002, May 24, 2002, and January 18, 2003, in the Korean Intellectual Property Office, the disclosures of which are incorporated herein in their entireties by reference.

1. Field of the Invention

The present invention relates to a surface light source apparatus, and more particularly, to a surface light source apparatus for forming a light guide pattern portion by scanning a laser beam using a head moving portion capable of moving above a light guide panel in vertical and horizontal directions, a method of manufacturing the surface light source apparatus, and an apparatus for manufacturing the surface light source apparatus.

2. Description of the Related Art

In general, a light guide panel is a plate providing a path through which light scanned from a light source is uniformly scattered and diffused. The light guide panel is applied to a light receiving flat display panel such as an LCD device, or a surface light source apparatus used for an illuminating signboard.

As a surface light source apparatus, a method of arranging a cold cathode fluorescent lamp (CCFL) or an LED, and a flat panel fluorescent lamp method in which a circuit board coated with a fluorescent material is assembled, are widely used. The CCFL can be classified into an edge light type using a light guide panel and a direct light type in which the light sources are arranged on a flat surface to overlap one another, according to the arrangement of a light source with respect to a display surface. These surface light source apparatuses are disclosed in Korean Patent Application Nos. 93-11174, 94-26117, 94-33115, 94-26116, and 2000-44725.

Referring to FIG. 1, a conventional surface light source apparatus 10 includes a light guide panel 11, a reflection panel 12 installed under the light guide panel 11, a light source 13 installed on a side wall of the light guide panel 11, and a cover member 14 covering the light source 13. A CCFL or an LED can be used as the light source 13.

A plurality of light guide pattern portions 15 printed using titanium oxide $TiO_2$ having a bead shape and ink including glass or acryl to scatter and diffuse light incident on one surface of a transparent acryl resin is formed on the light guide panel 11.

In the surface light source apparatus 10 having the above structure, light emitted from the light source 13 is incident on the light guide panel 11. The incident light is guided through the light guide panel 11 as indicated by an arrow and reflected by the reflection panel 12 and the light guide pattern portions 15 to have a relatively uniform intensity of illumination at each portion thereof.

However, the light guide pattern portions 15 formed in a print method has the following problems.

The processes of manufacturing and printing of ink to form the light guide pattern portions 15 are very complicated, and part of printed portions can be removed or smeared is high so that a defective ratio is very high. Yield of the light guide pattern portions 15 is about 80 through 90%, which is relatively low. Also, since the light guide panel 11 on which the light guide pattern portions 15 are not printed well cannot be reused after the light guide pattern portions 15 are removed, a manufacturing cost is increased.

In particular, since the light guide pattern portions 15 utilize optical reflection of a printed ink object itself, the ink object unavoidably absorbs light. The light absorption phenomenon lowers an efficiency of light of the surface light source apparatus.

Also, as shown in FIG. 2, a surface S of the light guide panel 11 is typically regularized to have a very small thickness deviation $t_1$ of about ±100 μm. Accordingly, a cost of a raw material of a product is relatively high. If the thickness deviation is regularized relatively greater, the cost of a raw material of a product can be lowered. However, when a screen 21 having a predetermined pattern containing ink objects is arranged on the surface S of the light guide panel 11 and the ink objects are printed by using a squeegee 22, the amount of coated ink in each area of the light guide panel 11 differs from one another by more than 50% due to the thickness deviation $t_1$ and the size of each of the light guide pattern portions 15 changes to 50 through 100 μm.

To solve the above problem, conventionally, a non-print method is adopted as shown in FIG. 3. As the non-print method, there is a stamping method using a mold and an injection mold method.

Referring to FIG. 3, a surface light source apparatus 30 includes a light guide panel 31, a reflection panel 32 installed under the light guide panel 31, and a light source 33 installed at a side wall of the light guide panel 31. A plurality of light guide pattern portions 34 having a plurality of grooves having conic shapes are formed on the light guide panel 31 by heating and pressing the light guide panel 31 using a mold having a protruding portion on one surface thereof. The shape of the section of the light guide pattern portion 34 forms a V shape, as shown in FIG. 4.

In the surface light source apparatus 30 having the above structure, light emitted from the light source 33 is incident on the light guide panel 31. When the incident light proceeds in the light guide panel 31, part of the light is reflected by an inclined surface of the light guide pattern portion 34.

However, the light guide pattern portion 34 has the following problem.

Since the light guide pattern portion 34 is formed in a heat and press method using a mold, the management of the process is very difficult. In particular, since acryl resin which is a material of the light guide panel 31 is very weak at heat, the light guide pattern portion 34 having a desired pattern cannot be accurately made.

Also, the above method realizes a surface light source simply by optical reflection by a mirror, which lowers the diffusiveness of light. As a result, a phenomenon that the shape of the light guide pattern portion 34 appears strongly, occurs. To prevent the phenomenon, a diffusion sheet is additionally arranged, however, the phenomenon is not completely removed.

Further, as shown in FIG. 5, the light guide panel 31 typically has a thickness deviation $t_2$ about ±100 μm. When the light guide pattern portion 34 is processed on the light guide panel 31 using a mold 51 having a processing depth of about 100 μm, a protruding portion 52 formed on the mold 51 can form the conic grooves at the thickest portion of the light guide panel 31 by heating and pressing the portion to the depth of 100 μm. However, at the thinnest portion of the light guide panel 31, the light guide pattern portion 34 is not processed at all.

Thus, to obtain an optimal light guide efficiency, a material having a very precise thickness deviation is needed and more than tens of correction works of the mold 51 should be repeated. Consequently, the cost for development rises. In addition, since the manufacturing duration of the mold 51 is extended, development of a variety of products is made difficult.

SUMMARY OF THE INVENTION

To solve the above and other problems, the present invention provides a surface light source apparatus which forms a light guide pattern portion on a light guide panel using a laser system capable of freely moving in vertical and horizontal directions by a mechanical driving and prevents in advance interfering factors occurring during scanning of a laser beam, a method of manufacturing the surface light source apparatus, and an apparatus for manufacturing the surface light source apparatus.

Also, the present invention provides a surface light source apparatus which forms a light guide pattern portion on one surface of the light guide panel by a laser beam process, and has a micro-lens portion in each of grooves formed in the light guide pattern portion so as to improve features of reflection and scattering of light, a method of manufacturing the surface light source apparatus, and an apparatus for manufacturing the surface light source apparatus.

Also, the present invention provides a surface light source apparatus which processes a light guide pattern portion having an intermittent shape on a lower surface of the light guide panel using a laser beam so as to have light guided in the entire surface of the light guide panel at a uniform brightness, a method of manufacturing the surface light source apparatus, and an apparatus for manufacturing the surface light source apparatus.

According to an aspect of the present invention, an apparatus for manufacturing a surface light source apparatus in which a light guide pattern portion is formed on a light guide panel, which comprises a pattern design system to which data about a pattern to be formed on the light guide pattern is input, a control system connected to the pattern design system and transmitting a position signal matching a coordinate value of each pattern to be formed on the light guide panel, a header moving portion mechanically moving vertically and horizontally according to the position signal received from the control system, a laser system outputting a laser beam according to a pulse signal synchronized with a movement of the header moving portion, a lens portion allowing a laser beam output from the laser system to pass the header moving portion and to be focused on a scanning surface of the light guide panel, a warp prevention unit preventing the light guide panel from warping due to a local heating by the laser beam, and an absorption and scattering prevention unit preventing smoke generated when the light guide pattern portion is formed on the light guide panel.

According to another aspect of the present invention, a surface light source apparatus comprises a light guide panel processed by a laser beam to scatter and diffuse light at a uniform brightness in an entire area and a light guide pattern portion having a plurality of grooves having an intermittent shape, at least one light source installed at one side wall of the light guide panel and emitting light to the light guide panel, and a reflection panel installed at a lower portion of the light guide panel, wherein the grooves having an intermittent shape of the light guide pattern portion is formed by scanning a laser beam output from a laser system via a mirror header portion onto a scanning surface of the light guide panel by time control while the mirror header portion horizontally moves on an X-axis guide rail and the X-axis guide rail vertically moves with respect to a Y-axis guide rail.

According to yet another aspect of the present invention, a surface light source apparatus comprises a light guide panel processed by a laser beam to scatter and diffuse light at a uniform brightness in an entire area and a light guide pattern portion having a plurality of grooves satisfying an equation that $$d(\mu m) \times \frac{w(\mu m)}{p(\mu m)} = 25 \sim 65,$$

wherein the range of $\frac{t(\text{mm})}{S(\text{mm}^2)}$ is $6 \times 10^{-5} \sim 1.2 \times 10^{-4}$, wherein t is a thickness of the light guide panel, S is an area of a process surface of the light guide panel, d is a process depth of the light guide pattern portion, w is a line width of each groove of the light guide pattern, and p is a pitch between the grooves of the light guide pattern portion, and at least one light source installed at one side wall of the light guide panel and emitting light to the light guide panel.

According to still yet another aspect of the present invention, a method of manufacturing a surface light source apparatus comprising the steps of forming a light guide pattern portion having a plurality of grooves on one surface of a light guide panel by emitting a laser beam within a range satisfying an equation that $$d(\mu m) \times \frac{w(\mu m)}{p(\mu m)} = 25 \sim 65,$$

wherein the range of $\frac{t(\text{mm})}{S(\text{mm}^2)}$ is $6 \times 10^{-5} \sim 1.2 \times 10^{-4}$, wherein t is a thickness of the light guide panel, S is an area of a process surface of the light guide panel, d is a process depth of the light guide pattern portion, w is a line width of each groove of the light guide pattern, and p is a pitch between the grooves of the light guide pattern portion, forming at least one light source installed at one side wall of the light guide panel and emitting light to the light guide panel, and installing a reflection panel reflecting the light emitted from the light source and guided in the light guide panel at a portion corresponding to a light guide surface where the light guide pattern portion is formed.

BRIEF DESCRIPTION OF THE DRAWINGS

The above features of the present invention will become more apparent by describing in detail preferred embodiments thereof with reference to the attached drawings in which.

DETAILED DESCRIPTION OF THE INVENTION

Figure 1:
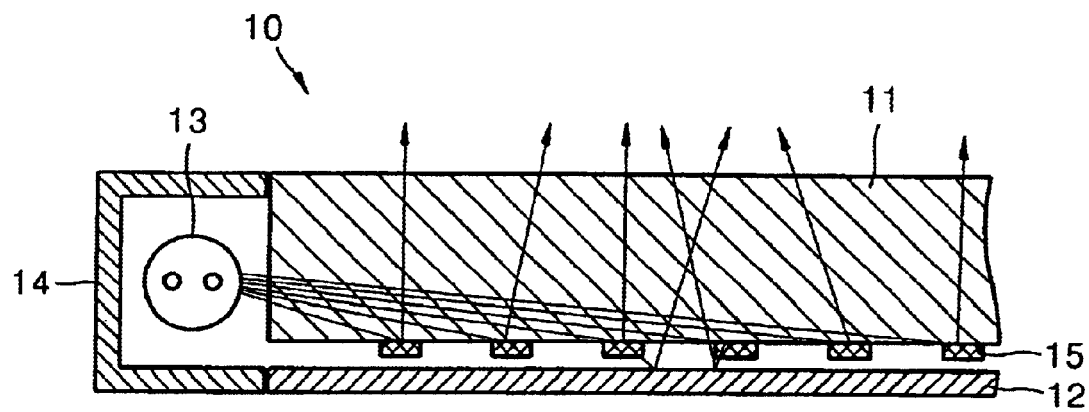
FIG. 1 is a sectional view illustrating a conventional surface light source apparatus.
Figure 2:
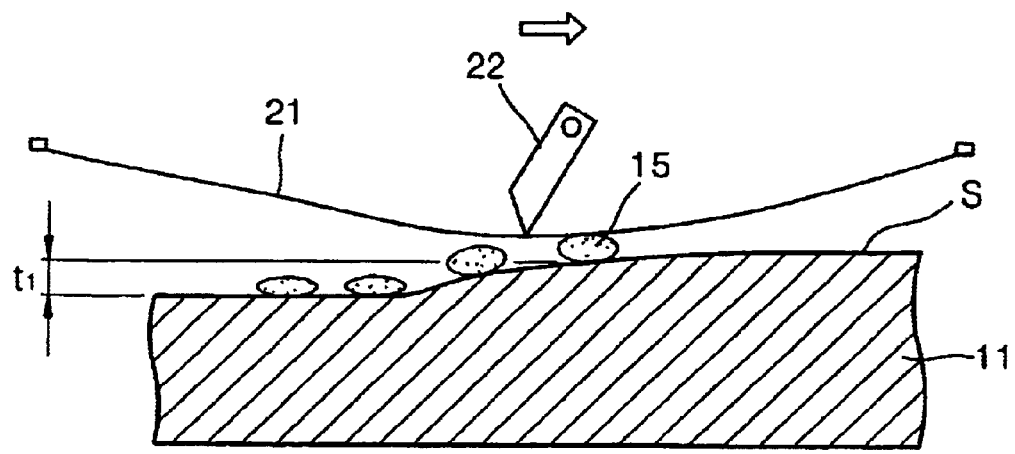
FIG. 2 is a view illustrating a state in which a light guide pattern portion is formed on the light guide panel of FIG. 1.
Figure 3:
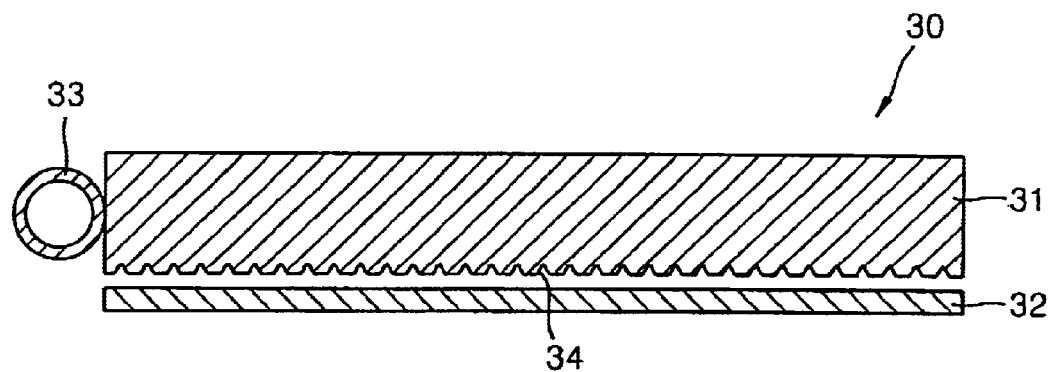
FIG. 3 is a sectional view illustrating another example of the conventional surface light source apparatus.
Figure 4:
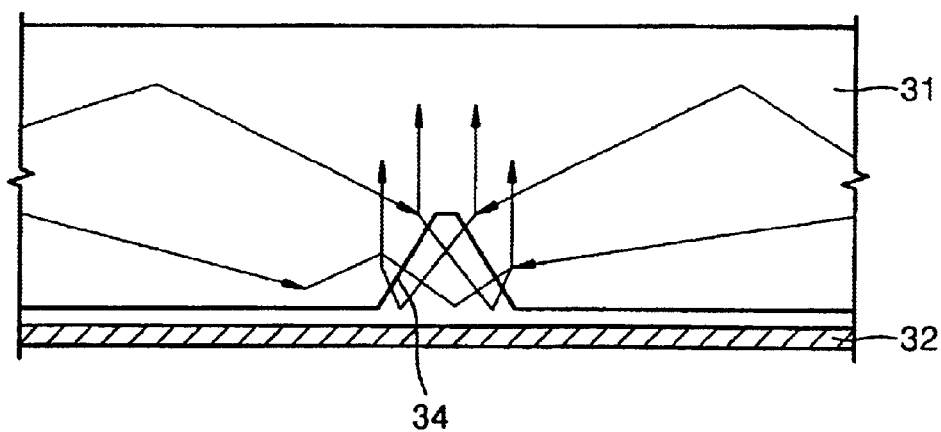
FIG. 4 is an enlarged sectional view of a portion of FIG. 3.
Figure 5:
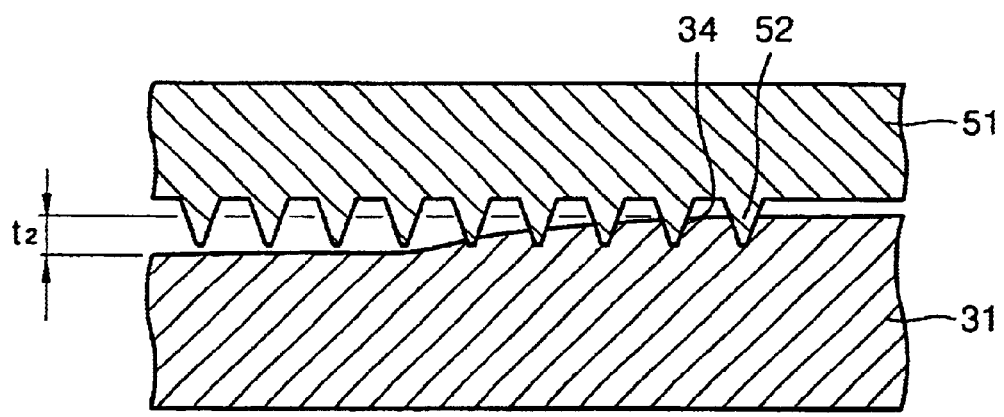
FIG. 5 is a view illustrating a state in which the light guide pattern portion is formed on the light guide panel of FIG. 4.
Figure 6:
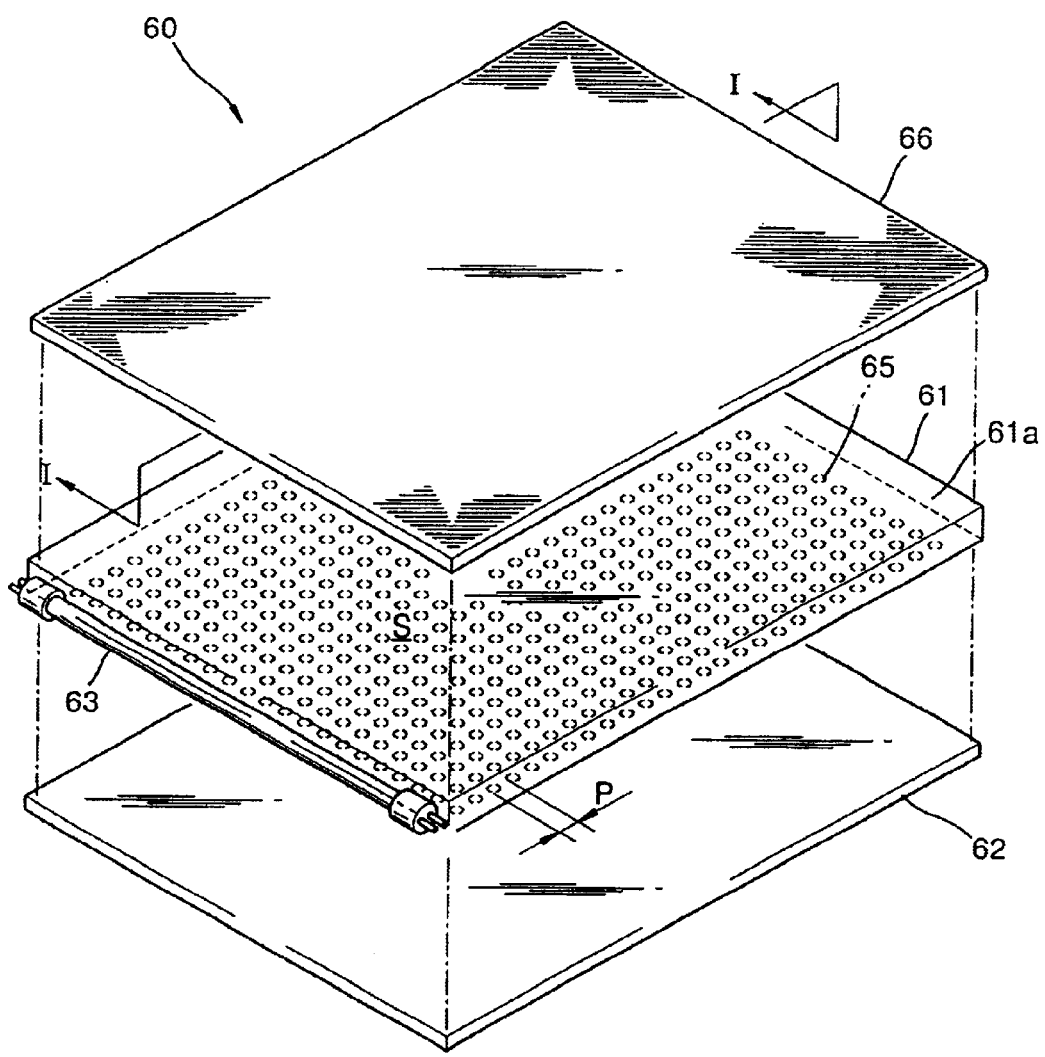
FIG. 6 is an exploded perspective view illustrating a surface light source apparatus according to a preferred embodiment of the present invention.
Figure 7:
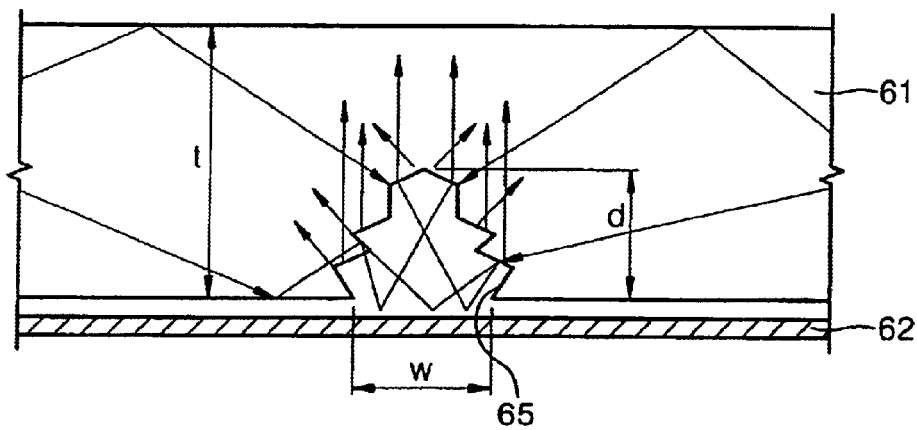
FIG. 7 is an enlarged sectional view taken along line I—I of FIG. 6.

Referring to FIGS. 6 and 7, a surface light source apparatus 60 according to a preferred embodiment of the present invention includes a light guide panel 61. A light guide pattern portion 65 is formed on a lower surface of the light guide panel 61. A reflection panel 62 reflecting incident light upward is installed under the light guide panel 61. At least one light source 63 scanning light toward the light guide panel 61 is installed at a side wall of the light guide panel 62. A CCFL or LED may be used for the light source 63. Also, a cover member having a reflection film reflecting light emitted in a direction opposite to the light guide panel 61 toward the light guide panel 61 can be installed outside the light source 63.

A diffusion panel 66 scattering and diffusing light is further provided above the light guide panel 61. In addition, an optical diffusion portion formed of fine scratches to have the light scanned by the light source 63 uniformly diffused to the front side can be further provided on an upper surface of the light guide panel 61.

In the surface light source apparatus 60 having the above structure, each pattern of the light guide pattern portion 65 can be formed by scanning a laser beam using a laser system. Processing hindrance factors such as heat or smoke generated during scanning of a laser beam can be removed by an additional hindrance prevention unit. Also, the light guide pattern portion 65 is processed in the above-described non-contact method to function as a microlens portion to effectively scatter and diffuse light.

In detail, the light guide pattern portion 65 formed on of the light guide panel 61 includes a plurality of grooves having a predetermined pattern. The light guide pattern portion 65 is processed in the non-contact method, for example, using a laser beam output from a laser apparatus which will be described later.

The light guide pattern portion 65 is formed throughout the entire area of the light guide panel 61 to effectively scatter and diffuse the light emitted from the light source 63 and passing through the light guide panel 61.

That is, the light guide pattern portion 65 may be a dot, rectangular, or grid type formed of grooves, each having a predetermined depth, or a combination type thereof, a dotted line type formed of intermittent grooves, each having a predetermined depth, or a linear type formed of repeated grooves. Also, the size of the light guide pattern portion 65 gradually increases from the light source 63 to increase a rate of light scattering and diffusion, or the pitch in the light guide pattern portion 65 can be gradually decreased.

The light guide pattern portion 65 has a profile which is an irregular saw-toothed shape generated due to vaporization of acryl resin during process using a laser beam. This fine saw-toothed shape functions as a micro-lens to improve scattering of light at a variety of angles.

When the saw-toothed light guide pattern portion 65 is processed to a predetermined depth using a laser beam output from a laser apparatus (not shown), the line width w, the pitch p between the grooves, and the depth d of the groove are defined by particular figures or equations.

That is, the line width w of each groove of the light guide pattern portion 65 processed by the laser apparatus is preferably 100 through 600 micrometers and the depth d of each groove is 20 through 200 micrometers.

When the line width w of the light guide pattern portion 65 is over 600 micrometers, a feature of diffusing light in the groove is deteriorated so that an efficiency of light guide is sharply lowered. As the diameter of a laser beam output from the laser apparatus increases, energy density is decreased. Accordingly, the depth d of the groove generating scattering of light in the light guide panel 61 is decreased and the line width w is increased.

When the light guide pattern portion 65 cannot be formed to have a desired process depth d because the line width w of the light guide pattern portion 65 is too large, a light diffusion effect cannot be obtained so that a sufficient brightness is not obtained. Also, when a high power laser apparatus is used to obtain a deep process depth with a large line width, light scattering due to the pattern is generated too strongly.

Accordingly, when the pitch p of the light guide pattern portion 65 is decreased, most light is consumed at the light guide pattern portion 65 close to the light source 63. As a result, the light uniformity of the light guide panel 61 cannot be obtained. Also, when the pitch p of the light guide pattern portion 65 is overly increased, since the pattern is shown, not covered by the diffusion panel 66, the outer appearance of the surface light source apparatus 60 is aesthetically deteriorated. Thus, a pitch p of the grooves of the light guide pattern portion 65 of 0.2 mm through 2 mm is appropriate.

On the contrary, when the line width w of the light guide pattern portion 65 is not more than 100 micrometers, since the width w of the groove is very narrow, optical energy of the laser beam output from the laser apparatus does not reach the bottom of the groove. Accordingly, the process of the light guide pattern portion 65 having a desired depth is not made properly so that an efficiency light diffusion effect cannot be obtained.

As described above, figures concerning the line width w of each groove of the light guide pattern 65, the process depth d of each groove, and the pitch p of the groove due to the process using a laser beam are very important to obtain a uniform brightness of the light guide panel 61.

In the meantime, since an optimal brightness and uniformity change according to the size S and thickness t of the light guide panel 61, they are important factors in design of the light guide pattern portion 65.

The above relationship can be expressed in the following equation.

$$d(\mu m) \times \frac{w(\mu m)}{p(\mu m)} = 25 \sim 65, \qquad \text{[Equation 1]}$$

wherein the range of $\frac{t(mm)}{S(mm^2)}$ is $6 \times 10^{-5} \sim 1.2 \times 10^{-4}$.

Here, t is a thickness of the light guide panel 61, S is an area of a process surface of the light guide panel 61, and d is a pitch between the grooves of the light guide pattern portion 65.

When the above values are satisfied, the light guide panel 61 can obtain optimal brightness and uniformity.

According to the present applicant's experiments, in which an efficiency of light guide according to the line width w of the light guide pattern portion 65 of the light guide panel 61 is measured by the output of the laser apparatus, the optimal line width w of the light guide pattern portion 65 to be applied to a large flat panel display device having a thickness of over 8 mm is about 100 through 600 μm and accordingly the output power of the laser apparatus should be about 30 through 200 W.

Figure 8:
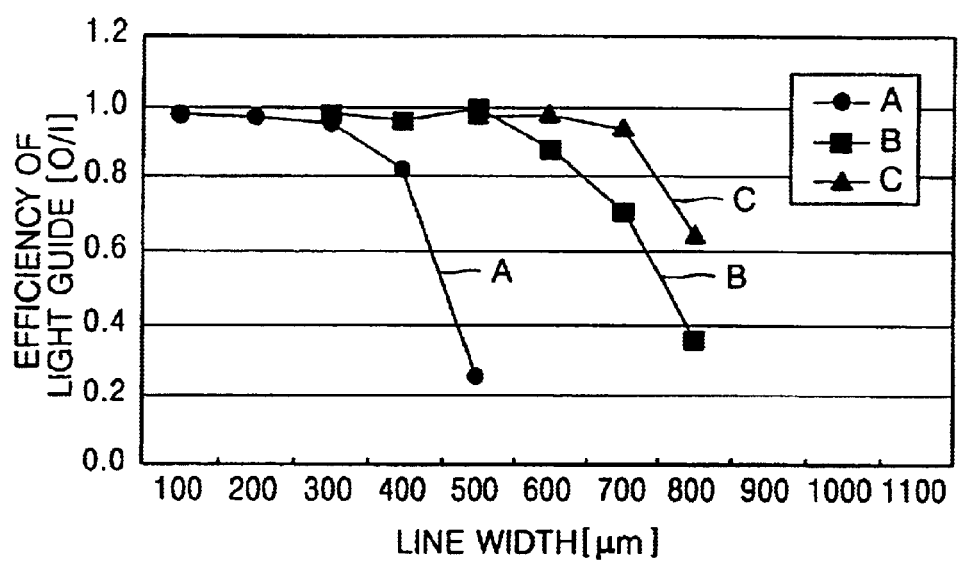
FIG. 8 is a graph showing an efficiency of light guide according to a line width of the light guide pattern portion of FIG. 6.

FIG. 8 shows an efficiency of light guide according to a change in the line width w of the light guide pattern portion 65 by the output power of the laser apparatus.

Referring to the graph of FIG. 8, X axis indicates the line width w of the light guide pattern portion 65 by 100 μm and Y axis indicates an efficiency of light guide. The efficiency of light guide is expressed by a relative brightness I which is the highest brightness according to a change in the line width of the light guide pattern portion 65 by the output power of the laser apparatus, when the light guide panel 61 applied to a 17 inches flat panel display device having a thickness of 8 mm is divided into 9 sections, the brightness of a central point of each of the 9 sections is measured, and the average brightness when the uniformity of brightness is over 70% is set as a reference $I_0$.

Curves A, B, and C form the light guide pattern portion 65 using laser apparatuses having different output powers in a range of 10–200W. When the line width of the light guide pattern portion 65 is within a range of 100 through 600 μm, a superior light guide efficiency close to 1.0 is shown.

In contrast, when the line width of the light guide pattern portion 65 is over 600 μm, the feature of diffusing light in the pattern is deteriorated so that the light guide efficiency is lowered.

Figure 9:
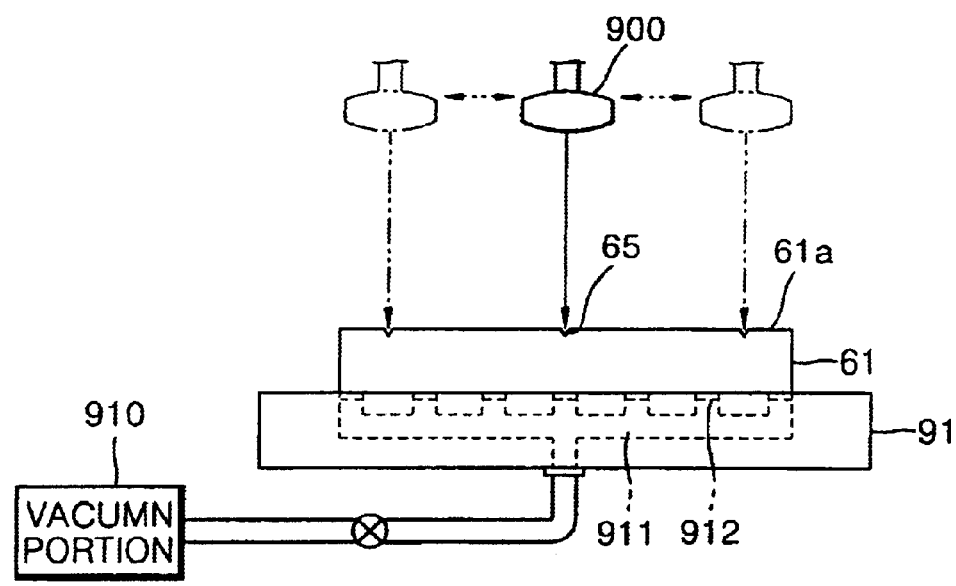
FIG. 9 is a view illustrating an apparatus for forming a light guide pattern portion on a light guide panel according to a first preferred embodiment of the present invention.

FIG. 9 shows an apparatus for forming the light guide pattern portion 65 on the light guide panel 61 according to a first preferred embodiment of the present invention.

Referring to FIG. 9, the light guide panel 61 is accommodated on a plate 91. A surface 61a of the light guide panel 61 where the light guide pattern portion 65 is formed is disposed to face a header moving portion 900 scanning a laser beam.

The header moving portion 900 scans a laser beam onto the light guide panel 61 while moving in vertical and horizontal directions with respect to the light guide panel 61 by a mechanical driving by an X Y stage. The structure of a laser system including the header moving portion 900 will be described later.

When the head moving portion scans a laser beam having a wavelength of over 1 μm onto the surface 61a of the light guide panel 61, the temperature of a focal point of the laser beam and a portion therearound increase so that a groove having a predetermined shape can be formed on the surface 61a. As the groove is formed in the entire area of the light guide panel 61, the light guide pattern portion 65 is formed.

When the laser beam is scanned onto a partial area of the surface 61a of the light guide panel 61, a heating reaction gradually spreads on the surface 61a due to a change in the width of the laser beam. When the heating reaction is severe, deformation of the light guide panel 61 such as a warp phenomenon is generated.

The warp phenomenon is generated severely at a peripheral portion of the light guide panel 61. As a result, an incident angle of a laser beam changes so that an accurate pattern is difficult to form. To prevent this, a warp prevention unit is installed at the light guide panel 61.

That is, a vacuum portion 910 which can completely suck one surface of the light guide panel 61 opposite to a surface where the light guide pattern portion 65 is formed is connected to the plate 91 where the light guide panel 61 is accommodated.

The vacuum portion 910 includes a plurality of vacuum path portions 911 which enable vacuum sucking of the light guide panel 61 through the plate 91. The vacuum portion 910, which is a pump system such as a mechanical vacuum pump, a movement amount transfer type vacuum pump, or an injection type vacuum pump, can suck a lower surface of the light guide panel 61 using vacuum through the vacuum path portions 911 by a pumping force of a pump.

A vacuum pad 912 can be further provided at a portion where the light guide panel 61 is sucked, to prevent scratches generated due to an external force during sucking. Instead of using the vacuum system, the light guide panel 61 can be fixed by adopting a coupling method such as joint fixing or clamp fixing using a physical mechanism.

In the state of fixing the light guide panel 61 using the warp prevention unit, a laser beam is scanned to form the light guide pattern portion 65. Accordingly, the warp phenomenon due to partial heating of the laser beam can be prevented in advance.

Figure 10:
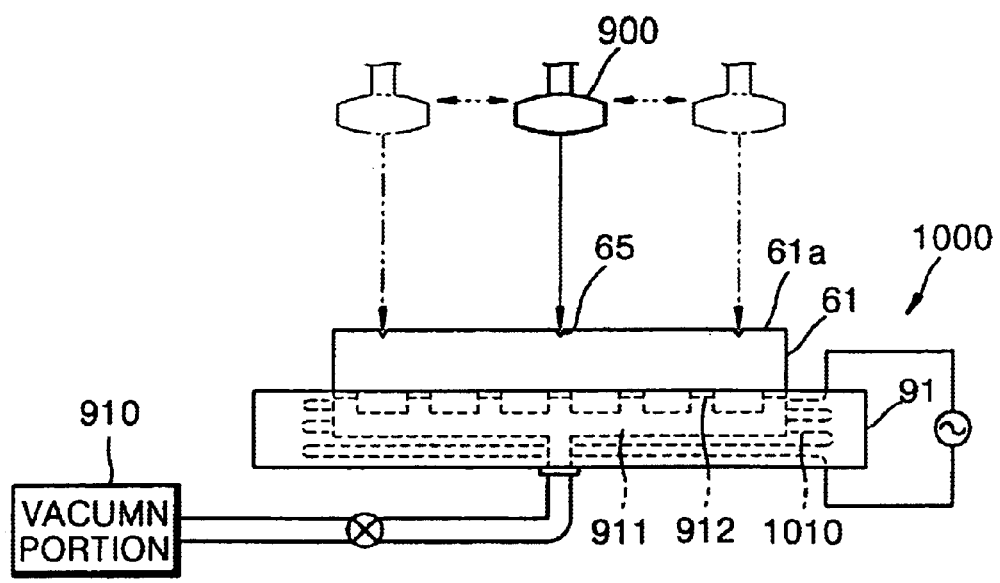
FIG. 10 is a view illustrating an apparatus for forming a light guide pattern portion on a light guide panel according to a second preferred embodiment of the present invention.

FIG. 10 shows an apparatus for forming the light guide pattern portion 65 on the light guide panel 61 according to a second preferred embodiment of the present invention. Here, the same reference numerals indicate the same elements having the same functions.

Referring to FIG. 10, the light guide panel 61 is accommodated on the plate 91. The scanning surface 61a of the light guide panel 61 is disposed to face the laser header moving portion 900 which scans a laser beam. A vacuum path portion 911 for sucking the light guide panel 61 using vacuum is formed in the plate 91. The vacuum path portion 911 is connected to the vacuum portion 910 which is a vacuum pump system providing a vacuum force. The vacuum pad 912 to prevent scratches on a surface of the light guide panel 61 sucked during vacuum sucking is installed on a path of the vacuum path portion 911.

A warp prevention unit can be additionally installed in preparation for a case when a close contact force of the plate 91 to the light guide panel 61 is not sufficient during scanning of a laser beam output from the laser system, while maintaining levelness of the light guide panel 61 by a vacuum system.

That is, a heating portion 1000 is installed at the plate 91. The heating portion 1000 includes a heat wire 1010 installed in the plate 91 and electrically generating heat. Alternatively, the plate 91 can be heated by heat generated by an ultrasonic wave and the heat may be transferred to the light guide panel 61.

When a predetermined heat is applied to the plate 91, the heat of the plate 91 is transferred to the opposite side of the light guide pattern portion 65 of the light guide panel 61 as much as the temperature increased by the laser beam scanning onto the scanning surface 61a of the light guide panel 61. Accordingly, the deviation of temperature between upper and lower portions of the light guide panel 61 can be removed so that a warp phenomenon can be prevented in advance.

In the meantime, since the etching method by scanning of a laser beam onto the light guide panel 61 is to heat the surface of the light guide panel 61 made of acryl resin with strong energy, smoke is generated due to vaporized an acryl resin material. The smoke causes absorption or scattering of a laser beam during the scanning process to form the light guide pattern portion 65 on the light guide panel 61. Accordingly, energy of the laser beam scanned onto the light guide panel 61 is reduced and the process of the light guide pattern portion 65 of a desired pattern is prevented.

Figure 11:
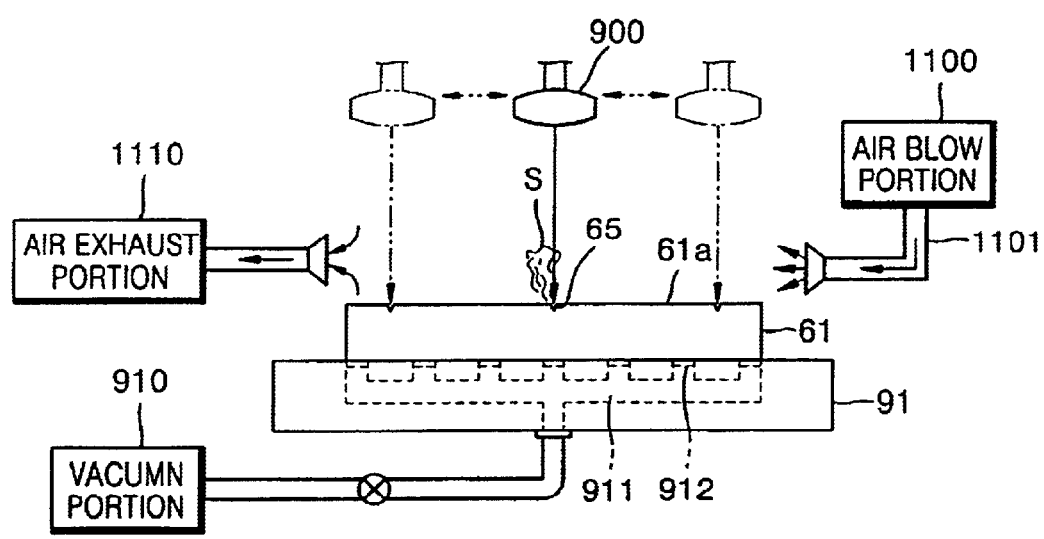
FIG. 11 is a view illustrating an apparatus for forming a light guide pattern portion on a light guide panel according to a third preferred embodiment of the present invention.

FIG. 11 shows an apparatus for forming the light guide pattern portion 65 on the light guide panel 61 according to a third preferred embodiment of the present invention to remove the above phenomenon.

Referring to FIG. 11, the light guide panel 61 is accommodated on the plate 91. The vacuum portion 910 which is a vacuum pump system for supplying vacuum to the light guide panel 61 is installed and connected to the plate 91 via the vacuum path portion 911. The vacuum pad 912 is installed on a surface of the light guide panel 61 which is sucked.

When part of the light guide panel 61 is removed by heat energy during scanning of a laser beam using the laser header moving portion 900, smoke s is generated from the scanning surface 61a of the light guide panel 61. The smoke s can be removed by an absorption and scattering prevention unit.

That is, an air blow portion 1100 for removing the smoke s is installed at one side of the light guide panel 61. The air blow portion 1100 blows air to the scanning surface 61a of the light guide panel 61 through an air blow pipe 1101 by injecting gas over the atmospheric pressure. The air blow portion 1100 removes the smoke s from the light guide panel 61 and simultaneously cools the scanning surface 61a of the light guide panel 61.

An air exhaust portion 1110 for removing the smoke s blown by the air blow portion 1100 is installed at the opposite side of the light guide panel 61. The air exhaust portion 1110 sucks and discharges the smoke s vaporized from the scanning surface 61a of the light guide panel 61 which is made of acryl resin, so that absorption or scattering of a laser beam due to the smoke s can be prevented.

Figure 12:
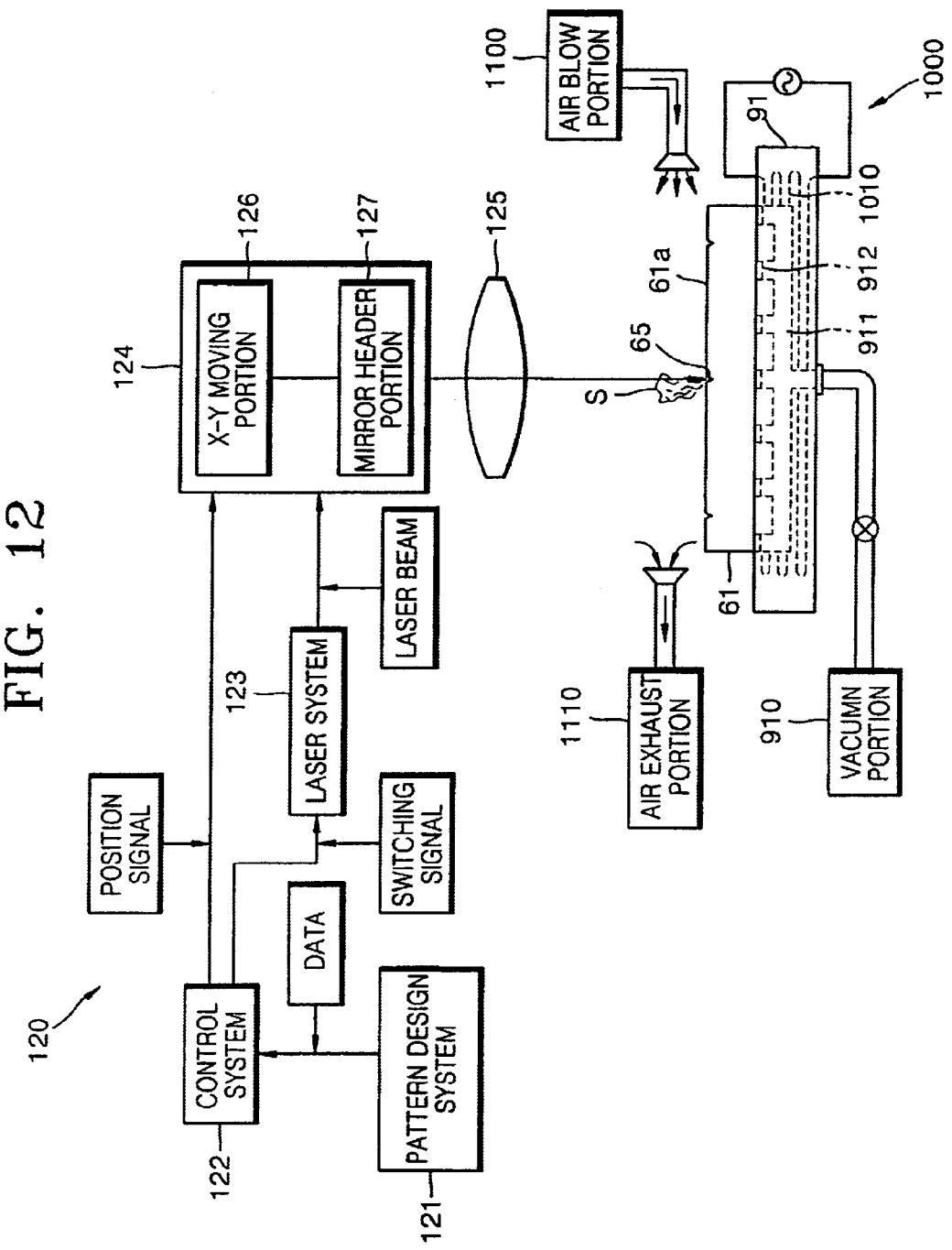
FIG. 12 is a view illustrating a system for forming a light guide pattern portion on a light guide panel according to a preferred embodiment of the present invention.

FIG. 12 shows a system for forming the light guide pattern portion on the light guide panel according to a preferred embodiment of the present invention.

Referring to FIG. 12, a pattern forming system 120 includes a pattern design system 121, a control system 122, a laser system 123, a header moving portion 124, a lens portion 125, a warp prevention unit for preventing warp of the light guide panel 61, and an absorption and scattering prevention unit for preventing absorption and scattering of a laser beam.

The header moving portion 124 includes an X-Y moving portion 126 which can be mechanically moved in X-Y direction, and a plurality of mirror header portions 127 coupled to the X-Y moving portion 126 to reflect a laser beam scanned by the laser system 123 toward the light guide panel 121.

In the operation of the pattern forming system 120 having the above structure according to the present invention, data of design rules of each pattern of the light guide pattern portion 65 to be formed on the light guide panel is input to the pattern design system 121. A position signal corresponding to an area of the scanning surface 61a of the light guide panel 61 to be scanned which matches coordinate values of each pattern is transferred to the header moving portion 124 via the control system 122.

A pulse signal synchronized with a mechanical movement of the header moving portion 124 in vertical and horizontal directions is transferred to the laser system 123 via the control system 122. The laser system 123 emits a laser beam.

The laser beam is reflected by the mirror header portions 127 and scanned onto the scanning surface 61a of the light guide panel 61 via the lens portion 125, so that the surface of the light guide panel 61 is processed. Accordingly, the light guide pattern portion 65 such as a dot pattern is formed on the scanning surface 61a of the light guide panel 61.

In this state, to prevent a warp phenomenon generated due to local heating of a laser beam output from the laser system 123, a vacuum force is supplied to the light guide panel 61 via the vacuum path portion 911 by operating a pump of the vacuum portion 910 connected to the plate 91 on which the light guide panel 61 is accommodated. Thus, the light guide panel 61 is vacuum-sucked against the plate 91 so that the entire area maintains levelness.

Also, when the close contact force of the light guide panel 61 by the vacuum unit is not sufficient with respect to the plate 91, a predetermined electric power is applied from the heating portion 1000 connected to the plate 91 to the light guide panel 61 to remove a difference in the temperature between the upper and lower surfaces of the light guide panel 61, so that the warp phenomenon can further be prevented.

In the meantime, to prevent the smoke generated from the light guide panel 61 which preventing the pattern process, air under a predetermined pressure is blown from the air blow portion 1100 installed at one side of the light guide panel 61 toward the scanning surface 61a.

The smoke removed by the air blow portion 1100 is exhausted by being sucked by the air exhaust portion 1110 installed at the other side of the light guide panel 61. As a result, the laser beam absorption and scattering phenomenon can be prevented.

Figure 13:
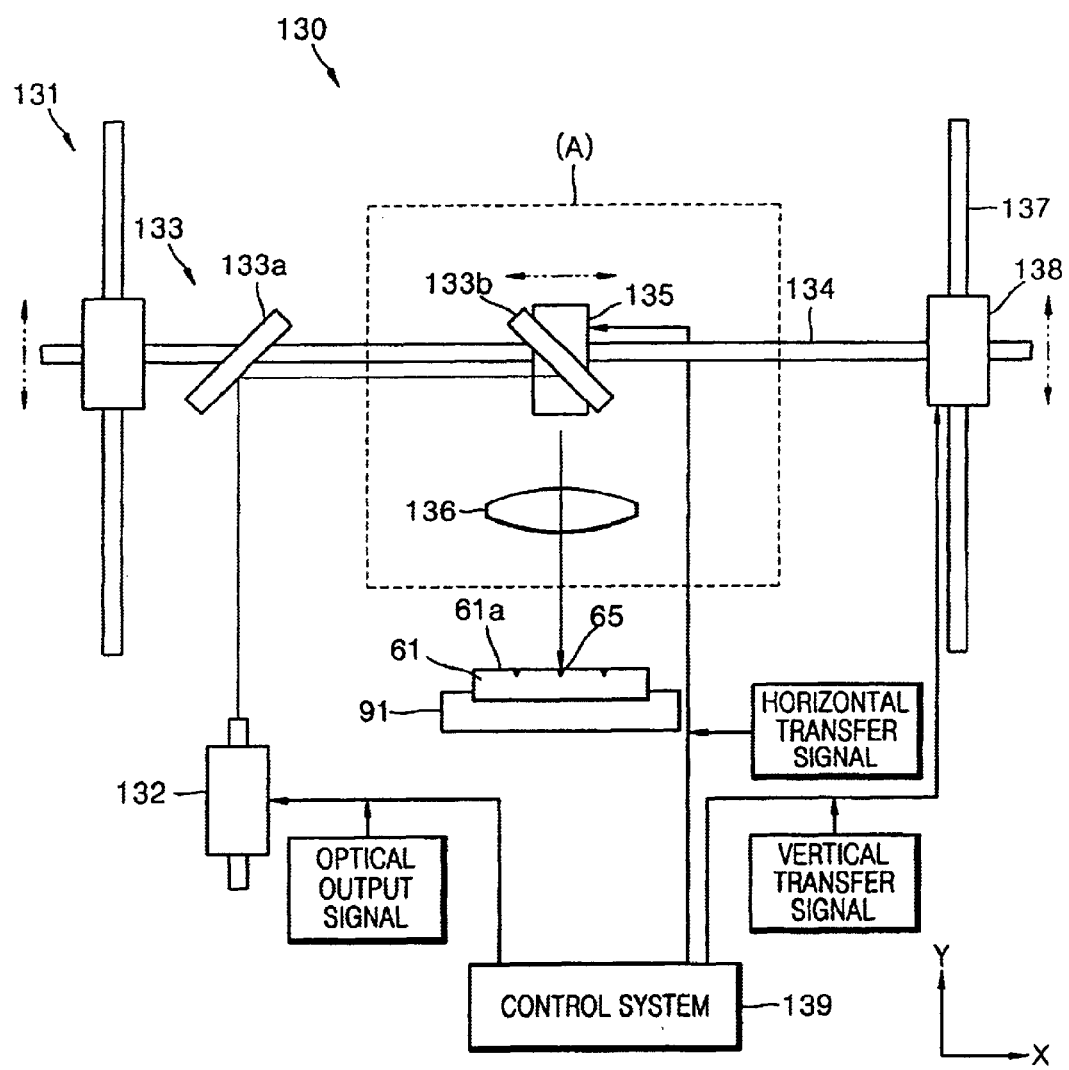
FIG. 13 is a view illustrating a header moving portion according to a preferred embodiment of the present invention.

FIG. 13 shows a header moving portion according to a preferred embodiment of the present invention.

Referring to FIG. 13, a header moving portion 130 includes an XY moving portion 131 which is mechanically movable in X and Y directions, and a plurality of mirror header portions 133 coupled to the XY moving portion 131 to reflect a laser beam output from the laser system 132 installed at one side of the header moving portion 130, toward the light guide panel.

A horizontal guide rail 134 arranged in the direction X is installed at the XY moving portion 131. Each of the mirror head portions 133 includes first and second mirror header portions 133a and 133b.

The first mirror header portion 133a is installed on the horizontal guide rail 134. The second mirror header portion 133b is coupled to the horizontal guide rail 134 capable of moving along the horizontal guide rail 134.

A horizontal linear motor 135 is installed on the horizontal guide rail 134 so that the second mirror header portion 133b can horizontally move along the horizontal guide rail 134. The horizontal linear motor 135 is a horizontal movement supply source connected to the second mirror header portion 133b.

A focus lens portion 136 is coupled to the second mirror header portion 133b and the focus lens portion 136 can move horizontally together with the second mirror header portion 133b.

A plurality of vertical guide rails 137 are installed at both ends of the horizontal guide rail 134. At least one vertical linear motor 138 is installed on the vertical guide rail 137. The horizontal guide rail 134 can be moved vertically along the vertical guide rail 137 by the vertical linear motor 138.

As described above, at least one mirror header portion 133 can be moved horizontally along the horizontal guide rail 134 by the horizontal linear motor 135 while the horizontal guide rail 134 can be moved vertically along the vertical guide rail 137 by the vertical linear motor 138.

In this state, an optical output signal transferred to the laser system 132, a horizontal transfer signal transferred to the horizontal linear motor 135, and a vertical transfer signal transferred to the vertical linear motor 138 are transmitted from a control system 139.

In the operation of the header moving portion 130 having the above structure, a pulse signal synchronized with the speed of movement of the second mirror header portion 133b mechanically transferred by a transfer signal of the control system 139 is transferred to the laser system 132 through the control system 139, so that the laser system 132 emits a laser beam.

The laser beam emitted from the laser system 132 proceeds toward the first mirror header portion 133a fixed at one side of the horizontal guide rail 134 and reflected by a mirror of the first mirror header portion 133a to proceed toward the second mirror header portion 133b. Then, the laser beam is perpendicularly reflected by a mirror of the second mirror header portion 13b and passes through the focus lens portion 136 so as to be incident on the scanning surface 61a of the light guide panel 61 to form the light guide pattern portion 65. When the second mirror header portion 133b is moved in the horizontal direction in a process area A by the horizontal linear motor 135, the laser beam is output in the horizontal direction to form the light guide pattern portion 65.

Since the vertical guide rail 137 is coupled to both end portions of the horizontal guide rail 134, the horizontal guide rail 134 can be moved vertically along the vertical guide rail 137 by the vertical linear motor 138 receiving the vertical transfer signal output from the control system 139. Thus, the laser beam is output in the vertical direction of the light guide panel 61 so that the light guide pattern portion 65 can be formed.

The shape of the light guide pattern portion manufactured by using the above-described system for forming the light guide pattern portion will now be described.

According to the characteristic feature of the present invention, in order to effectively scatter and diffuse the light incident on the lower surface of the light guide panel, a light guide pattern portion having an intermittent shape is formed by a laser process throughout the entire area of the light guide panel. The light guide pattern portion, which is a group of a discontinuous shape separated by a predetermined pitch, is formed by a predetermined design rule.

Figure 14:
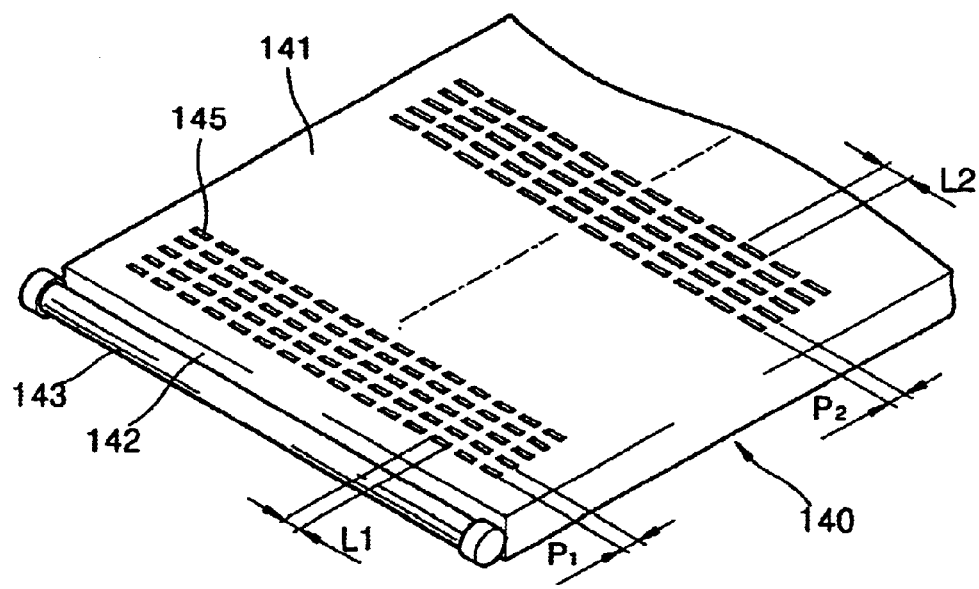
FIG. 14 is a perspective view illustrating part of the light guide panel according to the first preferred embodiment of the present invention.

FIG. 14 shows a light guide panel where a light guide pattern portion according to a first preferred embodiment is formed. Here, a pitch P of a groove in a vertical direction is a pitch between neighboring grooves in a direction perpendicular to a direction along which the light source is arranged, a length L of the groove is the length of each groove in a direction parallel to the direction along which the light source is arranged, and a pitch W of the groove in a horizontal direction is a pitch between neighboring grooves in the direction parallel to the direction along which the light source is arranged.

Referring to FIG. 14, a light guide pattern portion 145 is formed on one surface of a light guide panel 140. The light guide pattern portion 145 has a shape of discontinuous dotted lines and includes a plurality of grooves. The respective grooves are separated by a predetermined pitch.

The light guide pattern portion 145 is formed on the scanning surface 141 of the light guide panel 140 according to a predetermined design rule by the relationship of a relative position with respect to the light source 143.

That is, the light source 143 is installed at one wall 142 of the light guide panel 140. In the light guide pattern portion 145, a plurality of grooves are intermittently formed along a lengthwise direction of the light source 143 such that the length L1 of the groove in an area of the light guide panel 140 close to the light source 143 is shorter than that of the groove in the remaining area of the light guide panel 140.

In contrast, as the grooves are separated farther from the light source 143, the length L2 of the groove on the light guide panel 140 is formed greater than the length L1 of the groove in the area close to the light source 143.

The pitch P1 between the grooves in the peripheral portion of the light guide portion 141 close to the light source 143 is substantially the same as the pitch P2 between the grooves of the light guide panel 141 separated the farthest distance from the light source 143.

When the light source 143 is installed at both side walls of the light guide panel 140, the central portion of the light guide panel 140 is the farthest portion from the light source 143. Accordingly, the groove of the light guide pattern portion 145 at the central portion of the light guide panel 140 has the longest length throughout the entire area of the light guide panel 140. In contrast, the groove in the peripheral area of the light guide panel 140 has the shortest length.

As separated away from the light source 143, the grooves are formed on the light guide panel 140 such that the lengths of the grooves of the light guide pattern portion 145 gradually increase. The grooves are formed in a shape of discontinuous dotted lines along a direction parallel to the light source 143.

Accordingly, as separated away from the light source 143 installed at the side wall 142 of the light guide panel 140, the length of each groove in the light guide pattern portion 140 having an intermittent straight line shape gradually increases so that the amount of light guide is increased. Thus, lowering of brightness due to being separated away from the light source 143 can be prevented. Also, a uniform brightness can be obtained from the entire area of the light guide panel 140.

The light guide pattern portion 140 formed of a plurality of grooves having a straight line shape can be easily formed by the mechanical driving by the system shown in FIG. 12 to form the light guide pattern portion.

That is, the mirror header portion 127 capable of moving along a lengthwise direction in which the light source 143 is installed which is the X-axis direction of the light guide panel 140 moves at a constant speed and forms each groove of the light guide pattern portion 145 at a desired position by reflecting the laser beam output from the laser system 123 by the light guide panel 140.

The lengths of the grooves formed on the light guide panel 140 are different from one another. The different lengths of the grooves can be easily processed by controlling an electric signal to a position signal corresponding to a coordinate value of each pattern input to the control system 122, not by the mechanical control of the mirror header portion 127.

In relation to the mirror header portion 127 moving in the horizontal direction of the light guide panel 140, since each groove of the light guide pattern portion 145 formed on the light guide panel 140 has a straight line shape, the light guide pattern portion 145 can be formed without a dark line or a bright line.

Figure 15:
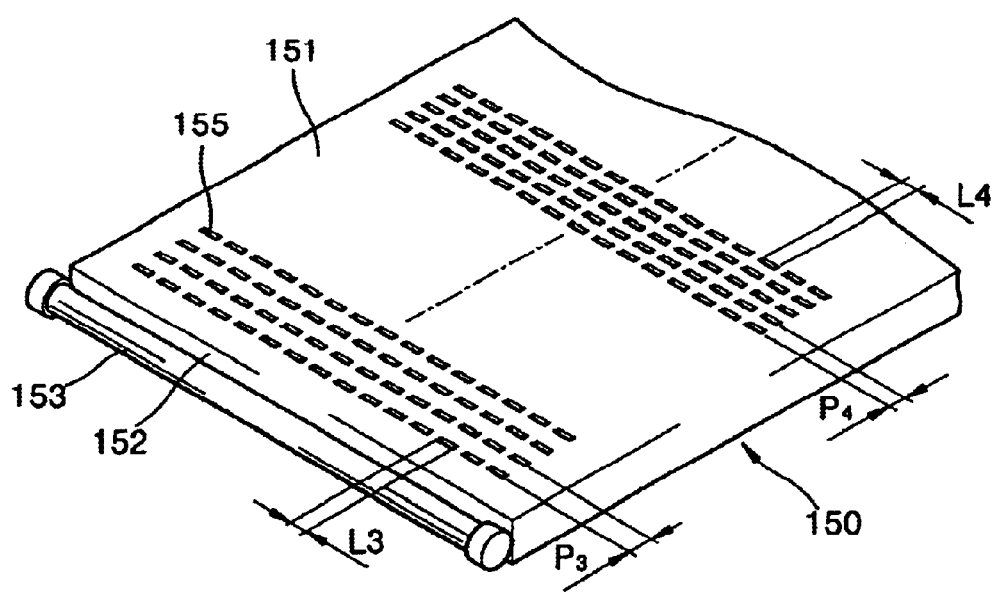
FIG. 15 is a perspective view illustrating part of the light guide panel according to the second preferred embodiment of the present invention.

FIG. 15 shows a light guide panel where a light guide pattern portion according to a second preferred embodiment of the present invention is formed.

Referring to FIG. 15, a light guide pattern portion 155 including a plurality of grooves having an intermittent straight line shape is formed on a light guide panel 150. The respective grooves of the light guide pattern portion 155 are formed on a scanning surface 151 of the light guide panel 150 by a predetermined design rule according to a relative relationship with a light source 153 installed at one side wall 152 of the light guide panel 150.

The grooves of the light guide pattern portion 155 are formed throughout the process area of the light guide panel 150 to have a different interval therebetween. That is, pitch P3 between the grooves at the peripheral portion of the light guide panel 150 close to the light source 153 is greater than pitch P4 between the grooves at the central portion relatively far from the light source 153.

Also, the pitch between the grooves gradually decreases from the area close to the light source 153 to the central portion of the light guide panel 150. In the meantime, the length L3 of the groove at the peripheral portion of the light guide panel 150 is substantially the same as the length L4 of the groove at the central portion.

Thus, the pitch between the grooves of the light guide pattern portion 155 varies to be gradually decreased on the light guide panel 150 as the grooves are positioned far from the light source 153. Each of the grooves is formed to have an intermittent straight line shape in a direction in which the light source 153 is installed.

Accordingly, although the grooves are positioned far from the light source 153, since the interval between the grooves of the light guide pattern portion 155 decreases, the amount of light guide increases so that the lowering of brightness can be prevented. The grooves of the light guide pattern portion 155 can be processed by the above-described system to form the light guide pattern portion.

Figure 16:
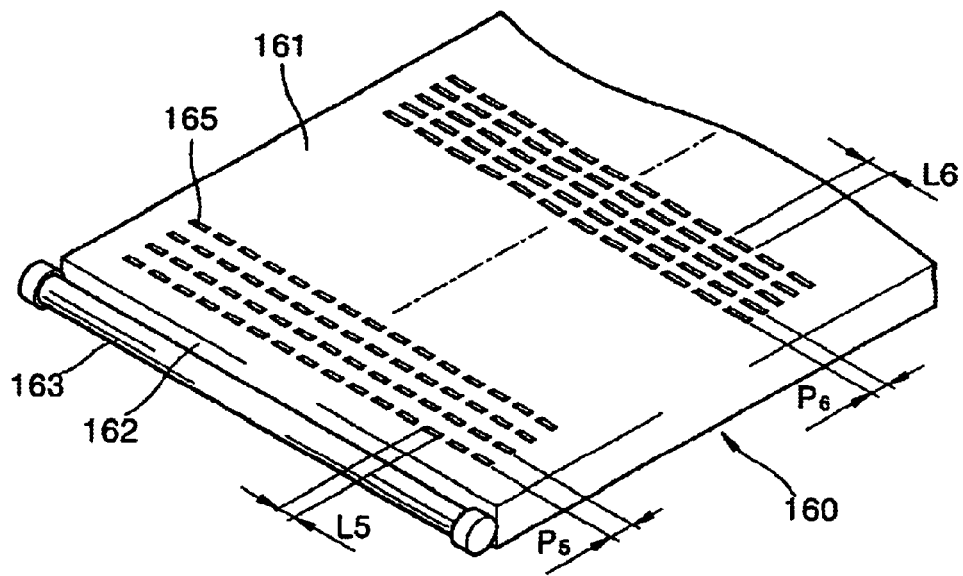
FIG. 16 is a perspective view illustrating part of the light guide panel according to the third preferred embodiment of the present invention.

FIG. 16 shows a light guide panel where a light guide pattern portion according to a third preferred embodiment of the present invention is formed.

Referring to FIG. 16, a light guide pattern portion 165 including a plurality of grooves having an intermittent straight line shape is formed by using a laser beam on a light guide panel 160. The respective grooves of the light guide pattern portion 165 are different in their lengths and pitches according to the distance from the light source 163.

That is, the length L5 of the groove at the peripheral portion of the light guide panel 160 close to the light source 163 installed at one side wall 162 of the light guide panel 160 is shorter than the length L6 of the groove at the central portion of the light guide panel 160 relatively far from the light source 163. In the meantime, pitch P5 between the grooves at the peripheral portion of the light guide panel 160 is greater than pitch P6 between the grooves at the central portion of the light guide panel 160.

Also, from the peripheral portion of the light guide panel 160 close to the light source 163 to the central portion of the light guide panel 160, the length of each groove gradually increases while the pitch between the grooves gradually decreases.

Thus, the length of each groove and the pitch between the grooves of the light guide pattern portion 165 are varied as the grooves are positioned on the light guide panel 160 far from the light source 163. Each of the grooves is formed in an intermittent straight line shape along a direction in which the light source 163 is installed.

The light guide pattern portion 165 having the above shape is process such that a desired pattern is formed by time control as the mirror header portion 127 of the above-described system to form the light guide pattern portion is horizontally moved at a constant speed above the scanning surface 146 of the light guide panel 160 while receiving an electric signal about the length of each groove and the pitch between the grooves.

Figure 17:
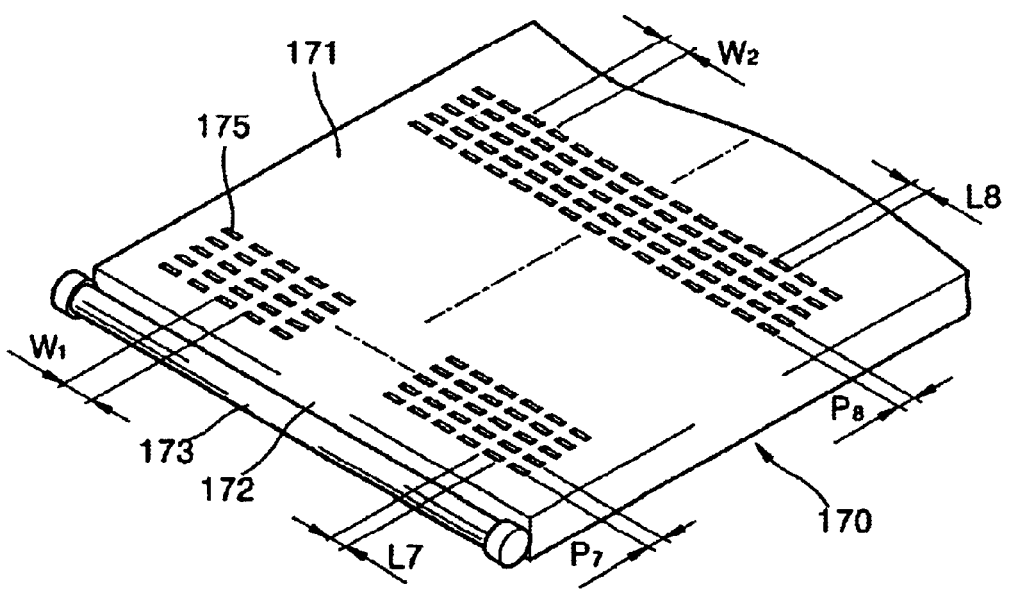
FIG. 17 is a perspective view illustrating part of the light guide panel according to the fourth preferred embodiment of the present invention.

FIG. 17 shows a light guide panel where a light guide pattern portion according to a fourth preferred embodiment of the present invention is formed.

Referring to FIG. 17, a light guide pattern portion 175 including a plurality of grooves having an intermittent straight line shape is formed on a light guide panel 170. The respective grooves of the light guide pattern portion 175 are formed on a scanning surface 171 of the light guide panel 170 by a predetermined design rule according to a relative relationship with a light source 173 installed at one side wall 172 of the light guide panel 170.

The respective grooves of the light guide pattern portion 175 are formed to have different pitches W1 and W2 in a horizontal direction throughout a processing area of the light guide panel 173. That is, the pitch W1 between the grooves at the peripheral portion of the light guide panel 170 close to the light source 173 is greater than the pitch W2 between the grooves at the central portion which is relatively far from the light source 173. Also, the interval between the grooves gradually decreases from the peripheral portion of the light guide panel 170 close to the light source 173 and the central portion of the light guide panel 170.

In the meantime, the length L7 of each groove and the pitch P7 between the grooves at the peripheral portion of the light guide panel 170 are substantially the same as the length L8 of each groove and the pitch P8 between the grooves at the central portion. The respective grooves of the light guide pattern portion 175 are processed by the above-described system to form the light guide pattern portion.

In the above light guide panel 170, the interval between the grooves of the light guide pattern portion 175 gradually decreases as the groove is positioned far from the light source 173. Each of the grooves is formed to have an intermittent straight line shape along a direction in which the light source 173 is installed.

Accordingly, although the grooves are positioned far from the light source 173, since the interval between the grooves of the light guide pattern portion 175 decreases, the amount of light guide increases so that the lowering of brightness can be prevented. The grooves of the light guide pattern portion 175 can be processed by the above-described laser system to form the light guide pattern portion.

The shape of the light guide pattern portion is not limited to the above-described preferred embodiments and any structure enabling the reflection, scattering, and diffusion of light output from the light source can be adopted. Also, in the above preferred embodiments, a uniform brightness can be obtained by adjusting a scattering feature of the amount of light guide by mixing the structures to vary the length of each groove, the width between the grooves, and the pitch between the grooves as the groove is positioned far from the light source.

Figure 18:
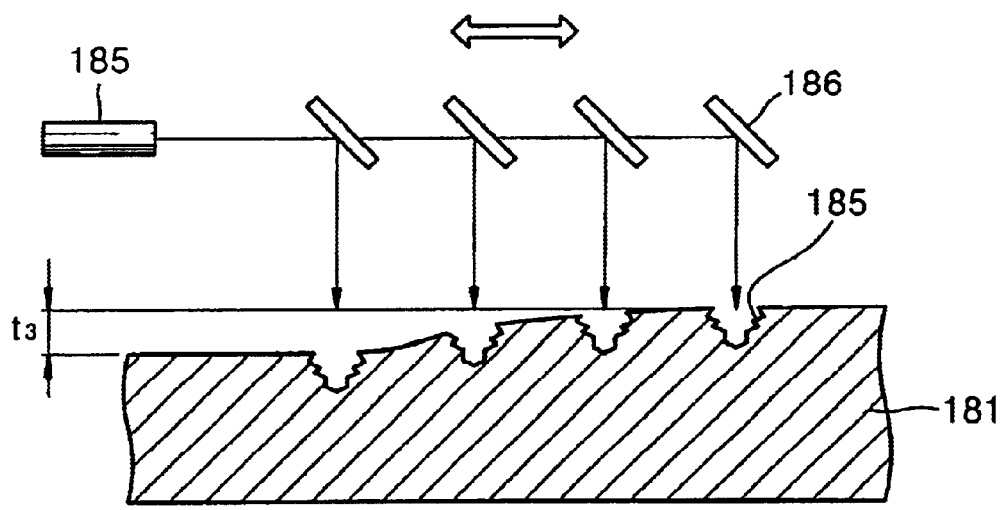
FIG. 18 is a view showing a state of forming the light guide pattern portion on the light guide panel according to a preferred embodiment of the present invention.

FIG. 18 shows a state of forming a light guide pattern portion by emitting a laser beam onto a light guide panel having a thickness deviation $t_3$ according to a preferred embodiment of the present invention.

Referring to FIG. 18, a perfect flat surface without a deviation is not available in a light guide panel 181 and a deviation in the thickness of the light guide panel 181 is typically about $\pm 100$ μm. When a laser beam is emitted on the light guide panel 181, a light guide pattern portion 185 having an inclined surface having a saw-toothed shape is formed. Here, a deviation with respect to the process depth of the light guide pattern portion 185 is about $\pm 20$ μm.

Even when the thickness of the light guide panel 181 has a deviation of $\pm 100$ μm, since a method of processing using a laser beam has a great light condensation property, the size of a diameter of a laser beam according to a change in the distance is not great. Thus, processing is possible over the entire area on the light guide panel 181 except for the deviation to the process depth in a state of excluding an effect on the deviation in the thickness of the light guide panel 181.

As described above, the surface light source apparatus, the method of manufacturing the same, and the apparatus for manufacturing the same according to the present invention can obtain the following effects.

First, as at least one of the mirror header portion can be mechanically moved vertically and horizontally on the X-Y moving portion, a light guide pattern portion can be processed on a raw material of a large sized light guide panel.

Second, since the output of the laser system can be increased, the movement speed of the header moving portion is increased so that the processing time can be reduced.

Third, since an expensive laser scanner is not used, the cost of an equipment for forming a light guide forming portion of the light guide panel can be reduced.

Fourth, since the incident angle of the laser beam does not change according to the position, a phenomenon that the light guide pattern portion is deformed can be prevented.

Fifth, a phenomenon that the light guide panel is partially bent due to the heat generated during the scanning performed on the light guide panel using a laser beam is prevented.

Sixth, a phenomenon that the energy of a laser beam is reduced since a light absorption and scattering phenomenon is generated due to smoke generated when the light guide pattern portion is formed is prevented in advance.

Seventh, since a light guide pattern portion having an intermittent and linear shape is formed on the light guide panel, an error due to the mechanical movement of the header moving portion of the laser processing apparatus in the vertical and horizontal directions can be reduced. Accordingly, a light guide pattern portion of a fine pattern can be processed without an error.

Eighth, since the light guide pattern portion having an intermittent shape is formed by outputting a laser beam from the laser processing apparatus according to the time control by transferring an electric signal not by a mechanical control, the defectiveness of a desired pattern can be prevented in advance.

Ninth, since the inner surface of each groove of the light guide pattern portion is saw-toothed, the groove can function as a microlens so that the scattering of light is improved. Accordingly, the amount of the light scattering portion additionally installed on the light guide panel can be reduced.

Tenth, since processing is performed in a non-contact method using a laser beam exhibiting a superior light condensation property, even when a distribution of the thickness of the light guide panel exists, a process error is hardly generated. Thus, since processing is possible by using a raw material of a light guide panel having a relatively greater thickness deviation, the raw cost of the material can be remarkably reduced.

Eleventh, since a method of scanning a laser beam onto the light guide panel is used, a mask or mold used for a printing or stamping method is not necessary so that a development and manufacturing period can be remarkably reduced.

Twelfth, since a method of engraving-processing the light guide panel itself using a laser beam is adopted, a light absorption loss is not generated on the light guide panel due to the use of additional material such as a print material so that the efficiency of light is greatly improved.

Thirteenth, when the light guide panels having different sizes are processed, since an additional apparatus according to the different sizes is not additionally needed, mass production is improved.

Fourteenth and the last, when the wasted surface light source apparatus is collected and recycled, since there is no attachment material such as a print material, the cost of recycling of a product is lowered.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A surface light source apparatus comprising:

a light guide panel configured to scatter and diffuse light at a uniform brightness in an entire area and a light guide pattern portion having a plurality of grooves satisfying an equation that $$d(\mu m) \times \frac{w(\mu m)}{p(\mu m)} = 25 \sim 65,$$

wherein the range of $\frac{t(mm)}{S(mm^2)}$ is $6 \times 10^{-5} \sim 1.2 \times 10^{-4}$, wherein t is a thickness of the light guide panel, S is an area of a process surface of the light guide panel, d is a process depth of the light guide pattern portion, w is a line width of each groove of the light guide pattern, and p is a pitch between the grooves of the light guide pattern portion, and at least one light source installed at one side wall of the light guide panel and emitting light to the light guide panel.

2. The apparatus as claimed in claim 1, wherein the line width of each groove of the light guide pattern portion is substantially between 100–600 $\mu$m.

3. The apparatus as claimed in claim 1, wherein a pitch between the grooves of the light guide pattern portion is substantially between 0.2–2 $\mu$m.

4. The apparatus as claimed in claim 1, wherein the depth of each groove of the light guide pattern portion is substantially between 20–200 $\mu$m.

5. The apparatus as claimed in claim 1, wherein the shape of a profile of each groove of the light guide pattern portion is irregularly saw-toothed to improve a feature of scattering of light.

6. The apparatus as claimed in claim 1, wherein at least one light diffusion portion diffusing light reflected by the light guide pattern portion is installed on the light guide panel.

7. The apparatus as claimed in claim 1, wherein the light guide panel is formed by a laser beam comprising light in an infrared ray range having a wavelength over 10 $\mu$m.

* * * * *